March 23, 1943.  R. E. JASPERSON  2,314,353
NAVIGATIONAL COORDINATOR
Filed April 19, 1941  2 Sheets-Sheet 1
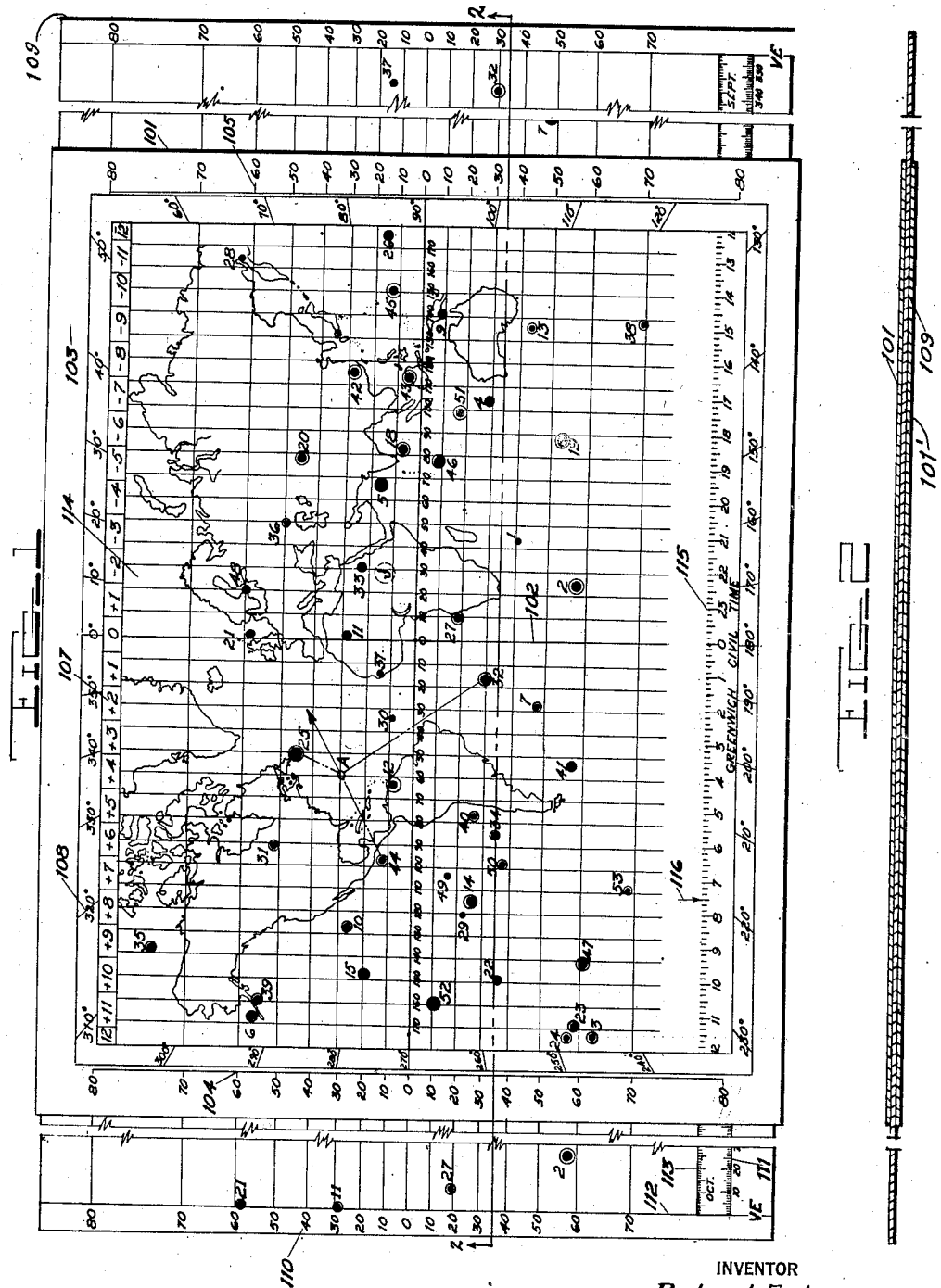
INVENTOR
Robert E. Jasperson
BY
ATTORNEY March 23, 1943.   R. E. JASPERSON   2,314,353
NAVIGATIONAL COORDINATOR
Filed April 19, 1941   2 Sheets-Sheet 2
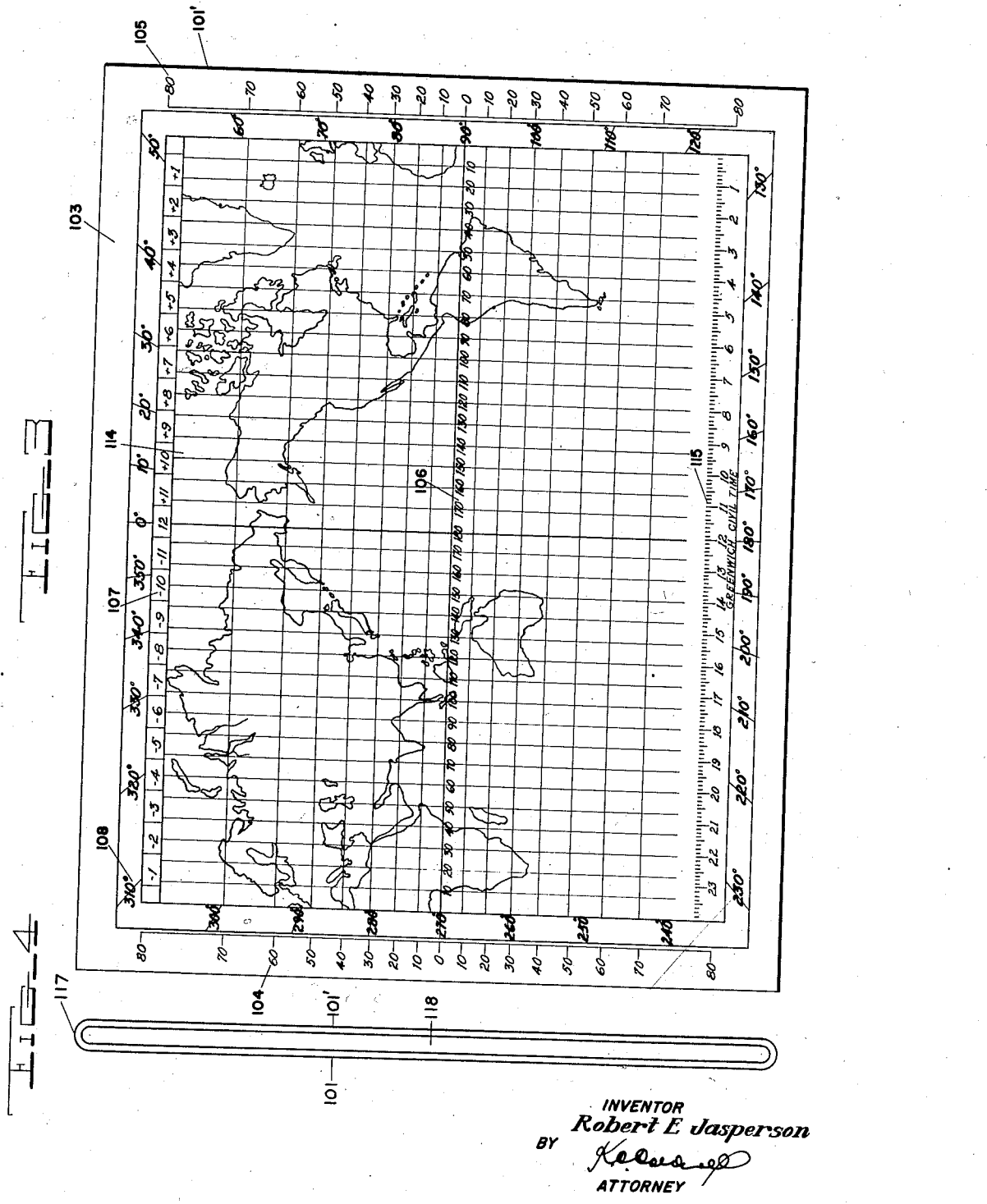
INVENTOR
Robert E Jasperson
BY
ATTORNEY Patented Mar. 23, 1943

2,314,353

UNITED STATES PATENT OFFICE 2,314,353

NAVIGATIONAL COORDINATOR

Robert Edward Jasperson, United States Navy

Application April 19, 1941, Serial No. 389,334

6 Claims. (Cl. 33—1)

(Granted under the act of March 3, 1883, as amended April 30, 1928; 370 O. G. 757)

This invention relates to a navigational coordinator for use in locating the positions of navigational celestial bodies and as a means for teaching certain navigational relationships. It is an object of this invention to provide a graphic representation of the relationship, at any given time, between any position on the earth's surface and that of any of the several celestial bodies employed in the practice of navigation.

Referring to the drawings:

Fig. 1 is a plan view of the coordinator;

Fig. 2 is an elevational view in section, taken along line 2—2 of Fig. 1 looking from the base thereof.

Fig. 3 is a plan view of the chart portion of the coordinator, showing the side opposite that shown by Fig. 1, in an embodiment of the invention in which two charts, positioned back to back, are employed; and, Fig. 4 is an end view of the chart portion of the coordinator as shown in Fig. 3.

The device comprises a transparent Celluloid rectangular chart of the earth drawn on the Mercator projection and centered on the meridian of Greenwich or the 180th meridian. As illustrated in Fig. 1, the chart 101 is shown as centered on the meridian of Greenwich at 102. The chart is composed of a transparent central face 114 surrounded by an opaque boundary surface 103 along each lateral side of which is inscribed a latitude scale 104, 105. A representation of the earth's surface is inscribed on the transparent surface of the chart and the surface is also provided with parallels of latitude and meridians of longitude, a longitude scale 106 being inscribed along the line representing the equator. A scale of zone descriptions 107 is inscribed along the upper boundary. Around the outer edge of the boundary surface 103 is inscribed a compass rose 108.

Slidable beneath this chart is a template 109 bearing, along its left hand edge a scale of declinations 110 and along its bottom edge a scale of right ascensions 111. These scales are based on the Mercator projection and are drawn to the same scale as that used for the latitude and longitude scales of the chart. The scale of right ascensions begins at the left hand edge of the template, the vertical line 112 of which represents the meridian passing through the vernal equinox. Inscribed on the surface of the template are representations of the various commonly used navigational stars, the coordinates of the positions of these stars being declination and right ascension. The stars are shown numbered in accordance with the alphabetical arrangement contained on the fly leaf of the 1940 Nautical Almanac. Directly above the scale of right ascensions on the template is inscribed a calendar 113 in increments of one civil day. This calendar represents successive positions of the meridian of Greenwich with relation to the vernal equinox for 0 hours G. C. T. for each day of the year. Or stated in another manner, it represents the G. H. A. of the vernal equinox at 0 hours G. C. T. for each civil day. At $0^h01^m08^s$ G. C. T. on 21 September 1940, the G. H. A. of the vernal equinox is 0 degrees. That is to say, it coincides with the meridian of Greenwich. From that date the G. H. A. of the vernal equinox increases approximately 59'.2. This calendar will be sufficiently accurate for a period of four years, a length of time during which the positions of the fixed stars on the template will be accurate for all practical purposes.

Inscribed on the chart and so positioned as to lie directly on top of the above mentioned calendar is a scale 115 of G. C. T. preferably subdivided into increments of 4 minutes, although the scale shown in the drawings has been subdivided into increments of 10 minutes for purposes of clarity. This scale has its origin in the center of the chart at the meridian of Greenwich.

A chart similar to the one described above but centered on the 180th meridian is in the preferred form of the invention secured back to back to the above mentioned chart along its top and bottom edges; such a chart is indicated at 101' and is shown best in Fig. 3. When this form is followed the template may be the same as described above or for added convenience each of its faces may be the duplicate of the other. The template slides between charts 101 and 101'. As shown in Fig. 4 the transparent material on which charts 101 and 101' are formed, may be in the form of a flattened tube 117, a space 118 being left within for the sliding accommodation of the template. Other conventional means for joining two sheets of material at their edges to leave a space between may be employed to fasten together the charts 101 and 101', if desired. This arrangement permits of the convenient solution of navigational problems from any point on the earth's surface.

On this reversed chart the scale 115 of G. C. T. will have its origin at the right hand edge of the chart and extend to the westward throughout 24 hours.

To use this coordinator it is first necessary to establish the position of the meridian of Greenwich relative to the fixed stars for the time and date in question. This is done by erecting a penciled arrow directed at the desired date on the calendar 113 to serve as a reference point with respect to the G. C. T. scale 115. When the template is inserted beneath the transparent chart, the chart and template are so positioned that the arrow points to the desired value of G. C. T. and the template is now correctly positioned for the desired G. C. T. of the day in question. Since our clocks are regulated to zone time, it is only necessary to apply the zone description to the watch time at any instant to obtain G. C. T.

The coordinator may now be set for any value of G. C. T., L. C. T. or zone time, the latter being the preferred method. The application of this device to the solution of problems in celestial navigation may best be described by reference to a typical problem.

*Problem*

On 1 June 1940 a craft is in D. R. position lat. 30° N., long. 62° W. ("A") on course 060°. The navigator desires to ascertain which stars will be best situated for a good fix at 0330 watch time. Craft keeping Zone +4 time.

*Solution*

It is necessary first to ascertain the G. C. T. corresponding to 0330 watch time. This is done by adding four hours to the watch time, which gives a G. C. T. of 0730.

A penciled arrow 116 is now erected on the template pointing to the date of 1 June on the calendar 113. The positions of the sun, moon and planets may now be penciled on the template in accordance with their declination and G. H. A. at 0ʰ G. C. T. on 1 June 1940.

The coordinator is now oriented by inserting the template beneath the chart 101 and positioning the template so that the arrow 116 lies directly under the hour of 0730 on the G. C. T. scale 115. The fixed stars together with the sun, moon and planets which have been penciled on the template will now appear in their correct relation to the position "A" or any other position which might be indicated on the chart, for the G. C. T. in question.

From point "A" the stars best situated for a good fix appear to be #44 (Rasalague) astern, #32 (Fomalhaut) on the starboard beam and #25 (Deneb) on the port bow. Although the bearings of these bodies will be approximately correct if referred to the compass rose, there is nothing to indicate their respective altitudes. The declination and local hour angle of each star may be determined by inspection, however, and these data plus the latitude of the observer suffice to extract the altitude, and azimuth, from a table listing the elements of a spherical triangle, such as H. O. No. 214 "Tables of Computed Altitude and Azimuth." The altitudes and azimuths of the three bodies just cited are:

44 _____ Alt.=52° Az.=110° N.-W.
32 _____ Alt.=17° Az.=142° N.-E.
25 _____ Alt.=72° Az.= 23° N.-E.

If the altitude and azimuth of an unidentified body be known, its local hour angle and declination may be extracted from H. O. 214. These coordinates establish the identity of the body.

The watch time of transit of any celestial body may be determined readily by simply bringing that body under the standard meridian of the zone in which the observer is located and observing the corresponding time on the time scale.

The approximate bearing of any celestial body is readily determined for any value of civil time.

Other uses will become apparent from a more detailed study of the coordinator. It will prove of considerable value to students of navigation, since it graphically shows relationships between time and the relative positions of the earth and other celestial bodies in a manner to make these relationships readily understandable.

The scope of this invention is not to be restricted by the foregoing disclosure but only by the scope and limitations of the appended claims.

The invention described herein may be manufactured and/or used by or for the Government of the United States of America for governmental purposes without the payment of any royalties thereon or therefor.

I claim:

1. A navigational coordinator comprising a transparent rectangular chart of the earth drawn on the Mercator projection, scale means on said chart establishing the latitude and longitude of every point on the earth's surface shown thereon, and a scale of civil time inscribed thereon and having its origin at the meridian of Greenwich; in combination with a template slidable beneath said chart, said template bearing scales of declination and right ascension, based on the Mercator projection and drawn to the same scale as the latitude and longitude scales of said chart, and bearing indications of the positions of navigational celestial bodies in terms of the declination and right ascension of said bodies, said template having inscribed thereon a calendar representing the successive positions of the meridian of Greenwich with relation to the vernal equinox at 0 hours G. C. T. for each day of the year.

2. A navigational coordinator comprising a transparent rectangular chart of the earth drawn on the Mercator projection and centered on a standard reference meridian, scale means on said chart establishing the latitude and longitude on the earth's surface shown thereon and a scale of civil time inscribed thereon and having its origin at the meridian of Greenwich; in combination with a template slidable beneath said chart, said template bearing scales of declination and right ascension, based on the Mercator projection and drawn to the same scale as the latitude and longitude scales of said chart, and bearing indications of the positions of navigational celestial bodies in terms of the declination and right ascension of said bodies, said template having inscribed thereon a calendar representing the successive positions of the meridian of Greenwich with relation to the vernal equinox at 0 hours G. C. T. for each day of the year.

3. A navigational coordinator comprising a transparent rectangular chart of the earth drawn on the Mercator projection and centered in the meridian of Greenwich, a similar chart centered on the 180th meridian and secured back to back to said first mentioned chart along the top and bottom edges thereof, scale means on each of said charts establishing the latitude and longitude of every point of the earth's surface shown thereon, and a scale of civil time inscribed thereon and having its origin at the meridian of Greenwich: in combination with a template slidable between said charts, said template bearing scales of declination and right ascension based on the Mercator projection and drawn to the same scale as the latitude and longitude scales of said chart, and bearing indications of the positions of navigational celestial bodies in terms of their declinations and right ascensions, said template having inscribed thereon a calendar representing the successive positions of the meridian of Greenwich with relation to the vernal equinox at 0 hours G. C. T. for each day of the year.

4. A navigational coordinator comprising a transparent rectangular chart of the earth drawn on the Mercator projection and centered on the meridian of Greenwich, a similar chart centered on the 180th meridian and secured back to back to said first mentioned chart along the top and bottom edges thereof, scale means on each of said charts establishing the latitude and longitude of every point of the earth's surface shown thereon, and a scale of civil time inscribed thereon and having its origin at the meridian of Greenwich; in combination with a template slidable between said charts, said template bearing scales of declination and right ascension based on the Mercator projection and drawn to the same scale as the latitude and longitude scales of said chart, and bearing indications of the positions of navigational celestial bodies in terms of their declinations and right ascensions, said template having inscribed thereon a calendar representing the successive positions of the meridian of Greenwich with relation to the vernal equinox at 0 hours G. C. T. for each day of the year.

5. A navigational coordinator comprising a transparent rectangular chart of the earth drawn on the Mercator projection, and scale means on said chart establishing the latitude and longitude of every point of the earth's surface shown thereon; in combination with a template slidable beneath said chart, said template bearing scales of declination and right ascension, based on the Mercator projection and drawn to the same scale as the latitude and longitude scales of said chart and bearing indications of the positions of navigational celestial bodies in terms of the declination and right ascension of said bodies, said chart and said template bearing cooperative means, by the relative positioning of which the substantially correct bearing of said bodies with respect to any selected point on the surface of the earth as represented on said chart, may be established for any instant of time throughout the year.

6. A navigational coordinator comprising a transparent rectangular chart of the earth drawn on the Mercator projection and centered in the meridian of Greenwich, a similar chart centered on the 180th meridian and secured back to back to said first mentioned chart along the top and bottom edges thereof, scale means on each of said charts establishing the latitude and longitude of every point of the earth's surface shown thereon; in combination with a template slidable between said charts, said template bearing scales of declination and right ascension based on the Mercator projection and drawn to the same scale as the latitude and longitude scales of said chart, and bearing indications of the positions of navigational celestial bodies in terms of their declinations and right ascensions, each of said charts and said template bearing cooperative means, by the relative positioning of which the substantially correct bearing of said bodies with respect to any selected point on the surface of the earth as represented on said chart may be established for any instant of time throughout the year.

ROBERT EDWARD JASPERSON.